(12) United States Patent
Shah et al.

(10) Patent No.: US 11,748,393 B2
(45) Date of Patent: Sep. 5, 2023

(54) CREATING COMPACT EXAMPLE SETS FOR INTENT CLASSIFICATION

(71) Applicant: INTERNATIONAL BUSINESS MACHINES CORPORATION, Armonk, NY (US)

(72) Inventors: Abhishek Shah, Jersey City, NJ (US); Tin Kam Ho, Millburn, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1160 days.

(21) Appl. No.: 16/203,000

(22) Filed: Nov. 28, 2018

(65) Prior Publication Data

US 2020/0167604 A1 May 28, 2020

(51) Int. Cl.
| | |
|---|---|
| G06K 9/62 | (2022.01) |
| G06F 16/35 | (2019.01) |
| G06F 18/214 | (2023.01) |
| G06F 18/21 | (2023.01) |
| G06F 18/23213 | (2023.01) |
| G06V 30/262 | (2022.01) |
| G06N 20/00 | (2019.01) |

(52) U.S. Cl.
CPC ............ G06F 16/35 (2019.01); G06F 18/217 (2023.01); G06F 18/2148 (2023.01); G06F 18/23213 (2023.01); G06V 30/274 (2022.01); G06N 20/00 (2019.01)

(58) Field of Classification Search
CPC ...... G06F 16/35; G06K 9/726; G06K 9/6223; G06K 9/6257; G06K 9/6262; G06N 20/00
See application file for complete search history.

(56) References Cited

U.S. PATENT DOCUMENTS

| | | |
|---|---|---|
| 10,055,685 B1 | 8/2018 | Arel et al. |
| 2008/0154579 A1* | 6/2008 | Kummamuru ........ G06F 16/685 707/E17.103 |

(Continued)

FOREIGN PATENT DOCUMENTS

CN 104778482 3/2018

OTHER PUBLICATIONS

Brownlee ("A Gentle Introduction to k-fold Cross-Validation", pp. 1-19, Pub. Oct. 19, 2018; URL: http://web.archive.org/web/20181019052743/https://machinelearningmastery.com/k-fold-cross-validation/) (Year: 2018).*

(Continued)

Primary Examiner — Howard D Brown, Jr.
(74) Attorney, Agent, or Firm — Griffiths & Seaton PLLC

(57) ABSTRACT

Embodiments for creating compact example subsets for intent classification in a conversational system are provided. A set of content used for training an intent classifier is received from a conversational corpus. Entries within the set of content are separated into a first subset and a second subset, and a cross-validation operation is performed on the first and second subsets to identify a correctly labeled portion and an incorrectly labeled portion of the set of content. A reduced content used for performing a final training of the intent classifier is formed by combining a first number of the entries from the correctly labeled portion and a second number of the entries from the incorrectly labeled portion of the set of content.

12 Claims, 6 Drawing Sheets

(56) References Cited

U.S. PATENT DOCUMENTS

| | | | |
|---|---|---|---|
| 2015/0044659 A1* | 2/2015 | Basu | G09B 7/00 |
| | | | 434/350 |
| 2015/0179165 A1* | 6/2015 | Mohamed | H04M 3/5133 |
| | | | 704/251 |
| 2016/0063097 A1 | 1/2016 | Brown et al. | |
| 2017/0061322 A1* | 3/2017 | Chari | H04L 63/1425 |
| 2018/0053071 A1* | 2/2018 | Chen | G06N 20/10 |
| 2018/0268298 A1* | 9/2018 | Johansen | G06V 10/764 |
| 2018/0300576 A1* | 10/2018 | Dalyac | G06F 18/2178 |
| 2018/0329884 A1* | 11/2018 | Xiong | G06N 3/044 |
| 2020/0074984 A1* | 3/2020 | Ho | G10L 15/1815 |
| 2020/0090638 A1* | 3/2020 | Ugrani | G06F 16/338 |
| 2020/0167604 A1* | 5/2020 | Shah | G06F 18/23213 |
| 2020/0311616 A1* | 10/2020 | Rajkumar | G06N 3/008 |

OTHER PUBLICATIONS

Yu, Z. et al., "From cluster ensemble to structure ensemble", Inf. Sci. 198 (Sep. 2012), pp. 81-99, accessed Nov. 19, 2018.

Banda, J.M. et al., "Steps Toward a Large-Scale Solar Image Data Analysis to Differentiate Solar Phonema", Solar Physics, vol. 288, No. 1, pp. 435-446, published Nov. 2013, accessed Nov. 19, 2018.

Lopez-Inesta, Emilia et al. "Combining feature extraction and expansion to improve classification based similarity learning", published electronically Jul. 1, 2017. 17 pages. [Available Online Sep. 11, 2017] DOI: 10.1016/j.patrec.2016.11.005, accessed Nov. 19, 2018.

Woźnica et al. "A new framework for dissimilarity and similarity learning", Proc. of the 14th Pacific-Asia Conf. on Advances in Knowledge Discovery and Data Mining, vol. Part II (PAKDD'10), Springer-Verlag, 386-397 (2010), accessed Nov. 19, 2018.

* cited by examiner

CREATING COMPACT EXAMPLE SETS FOR INTENT CLASSIFICATION

BACKGROUND OF THE INVENTION

Field of the Invention

The present invention relates in general to computing systems, and more particularly, to various embodiments for training conversational systems with compact sets of intent data.

Description of the Related Art

Conversational systems are often implemented as an automated means to communicate between two parties. For example, customer contact center systems provide support for customers of a particular product or service by allowing those users to make requests for service that can include a question posed by the user related to the product or service. Generally speaking, these systems receive requests for service in various forms (e.g., in the form of a phone call, web page form, instant message, email, etc.), and route the requests to either a virtual agent or live, human agent for addressing the request and providing an answer to the question. For example, a chat or other interactive session can be conducted between the customer or client and an automated virtual agent which guides the interaction based on a set of scripts and a knowledgebase related to the topic of the contact. When implementing these conversational systems, the automated system must first be trained using intent data to correctly respond with regard to the context of the user's statement or question.

SUMMARY OF THE INVENTION

Various embodiments including a method for creating compact example subsets for intent classification in a conversational system are disclosed. A set of content used for training an intent classifier is received from a conversational corpus. Entries within the set of content are separated into a first subset and a second subset, and a cross-validation operation is performed on the first and second subsets to identify a correctly labeled portion and an incorrectly labeled portion of the set of content. A reduced content used for performing a final training of the intent classifier is formed by combining a first number of the entries from the correctly labeled portion and a second number of the entries from the incorrectly labeled portion of the set of content.

In addition to the foregoing exemplary embodiment, various other system and computer program product embodiments are provided and supply related advantages. The foregoing Summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
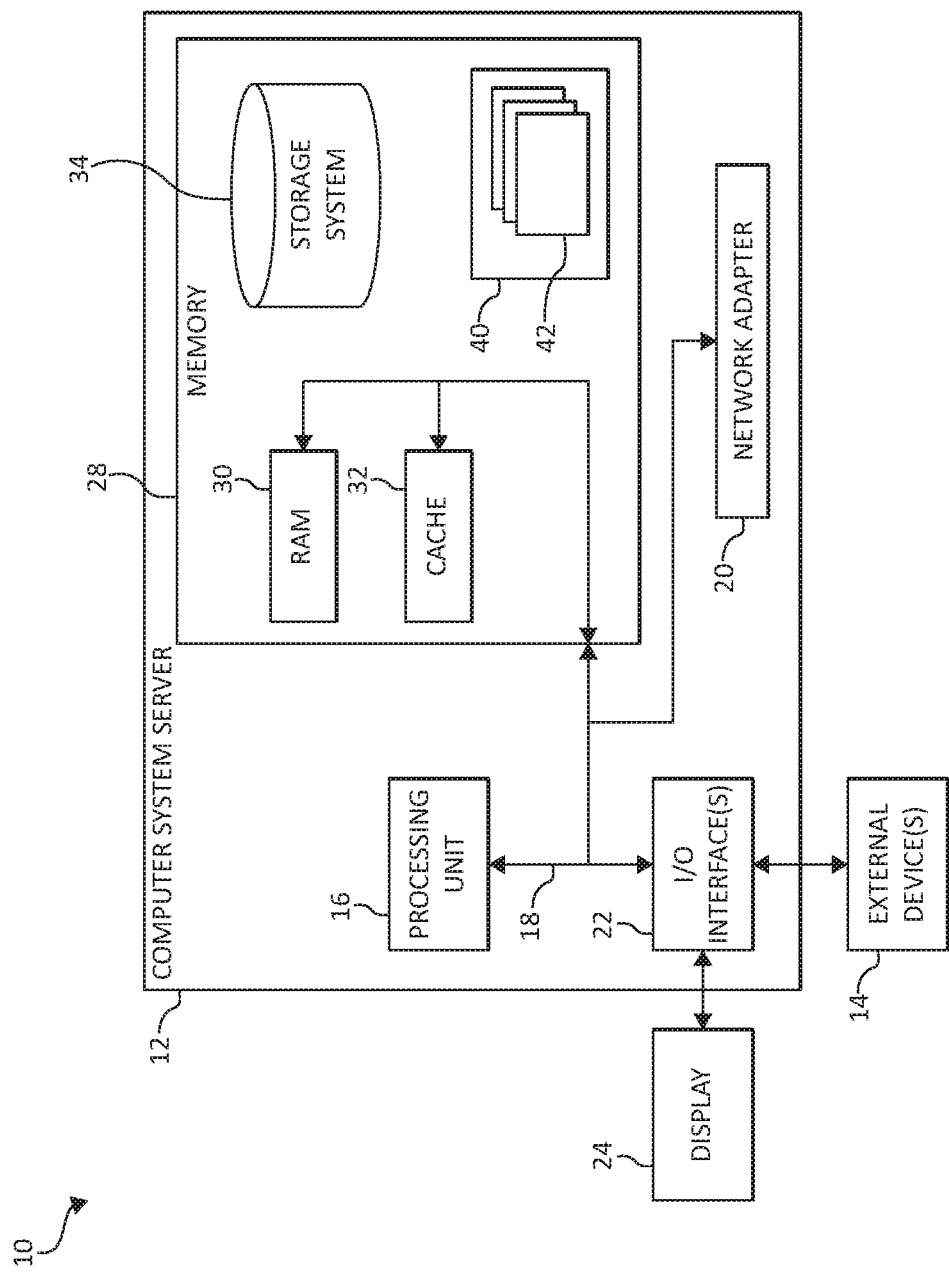
FIG. 1 is a block diagram depicting an exemplary computing node, according to embodiments of the present invention.

As previously mentioned, in contemporary customer contact centers (among other locations of implementations), the conversational systems therein provide support for customers of a particular product or service by allowing those users to make requests for service that can include a question posed by the user related to the product or service. In some cases, a chat session can be initiated between the customer or client and a live agent (e.g., a human operator) or a virtual agent (e.g., a chat bot operated by a computing system) who can interact directly with the customer over any one or more available channels (e.g., web chat, instant message, email exchange, etc.). In the case of relying more on virtual agents, often times a substantial obstacle to overcome when interacting with human customers or clients is ascertaining by the virtual agent what the underlying intent is of a query or statement posed by human customer or client.

Inherently, humans ask questions or utter statements in different semantic variances notwithstanding the intent of the question or statement in selected cases are similar. The intent in a conversational model is therefore a concept that represents a set of semantically similar sentences for which the same response is suitable in a dialog. For example, one client may pose the question "How can I reset my internet account", while another may state "I need to reset my internet password". These questions/statements, in each of which the intent would be fairly easily understood to be more or less equivalent by a human operator, may trigger a variety of responses from virtual agents. In one scenario, the virtual agent may interpret "resetting the internet account" question as a query regarding the resetting of the client's internet service in general (e.g., resetting a modem or router associated with their account), where the client's actual intent was the same as the other client requesting a password reset to get into their internet (billing) account, as in the latter example. A vast variety of examples exist like these in which virtual agents must be trained to offer accurate results to the client when provided with utterances of such variety.

Modern conversational systems recognize this limitation and attempt to create intent models by using statistical classifiers trained with sample utterances. That is, intent classification in conversational systems relies on a statistical model trained with enough example utterances (i.e., sentences) per intent such that the meaning of the intent is well-defined by those examples. Users/administrators often create the intents by collecting and annotating many utterances with their respective scope of intent through the training classifier, which is a labor-intensive process. This often results in the user providing a few sample utterances themselves, and sourcing additional examples through multiple other sources and methods. These sources/methods may range from crowd-sourcing to the implementation of machine learning techniques.

When developers of conversational systems harvest examples from these public sources, crowd-sources, or through paraphrasing using generative models, they are motivated to cover as many types of linguistic varieties as possible, and hence do not want to be restricted by system resources for maintaining such data. However, once the creation process concludes, there often comes a need to review, maintain, and store such data, which requires resources which may be constrained.

A primary issue users encounter when training these statistical classifiers is that the classifier, to be accurate, must be trained with a large set of the utterance examples collected from a corpus (e.g., a conversational database such as virtual agent chat logs, the crowd-sourced logs, etc.). Thus, an upper bound inherently exists as to the size of these example sets of utterances due to, among other reasons, limitations associated with the classification system resources (e.g., memory/processing resources necessary to store, maintain, and process the example utterances) and human labor resources necessary for the editing, reviewing, storing, and importing and exporting the utterances within the corpus. Therefore the training examples need to be selected carefully so that they can serve as the best representation of an intent while fitting within resource limits.

Accordingly, the functionality disclosed herein optimizes example sets of the utterances in order to best utilize the allowable resource limits of the system while still supporting training of the intent classifiers to the best achievable accuracy. Prior approaches for optimizing such data for training classification algorithms (e.g., the nearest neighbor algorithm) are limited in that such algorithms do not necessarily offer the most accurate text classification. Further, techniques for summarizing paragraphs cannot be applied to optimize example sets for intent classification, because the examples in this context are often short sentences containing few redundant words. Extracting a summary from each sentence therefore does not offer a useful reduction while maintaining a high classification accuracy rate.

The mechanisms of the present invention instead use a novel two-step approach to perform example selection from the corpus. First, a "core set" of example sentences and an "edge set" of example sentences are selected based on the behavior of the target classifier, where the core set includes example sentences well-recognized by the target classifier to be accurately associated with the given intent and the edge set includes example sentences incorrectly labeled as being associated with the given intent.

Next, an anti-clustering procedure is implemented to reduce the number of example sentences selected from the core set and the edge set, respectively, to finally train the target classifier—while maintaining the high classification accuracy rate given a wide variety of the example sentences ultimately selected. This two-step approach provides many advantages. First, since the example selection is driven by the target classifier's accuracy, the resultant examples delimit the intent class boundaries in accordance with the target classifier's expressive and generalization power. Second, the system covers a wide variety of linguistic variances, as the core set represents the sentences best fitting expectation for the intent, whereas the edge set provides reach to less typical sentences. Moreover, the anti-clustering procedure reduces the number of examples needed to span the scope delimited by both the core set and the edge set. Finally, in a benchmarking test, this two-step process produced a training set that led to better intent classification accuracy than a baseline set resulting from random sampling.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 (or memory subsystem 28) can include computer system readable media in the form of volatile memory, such as random access memory (RAM) 30 and/or cache memory 32. Cache memory 32 may comprise, for example, a shared cache (such as an L2 cache) which is shared among multiple cores of the processor 16 and/or may comprise a private cache (such as an L1 cache). Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
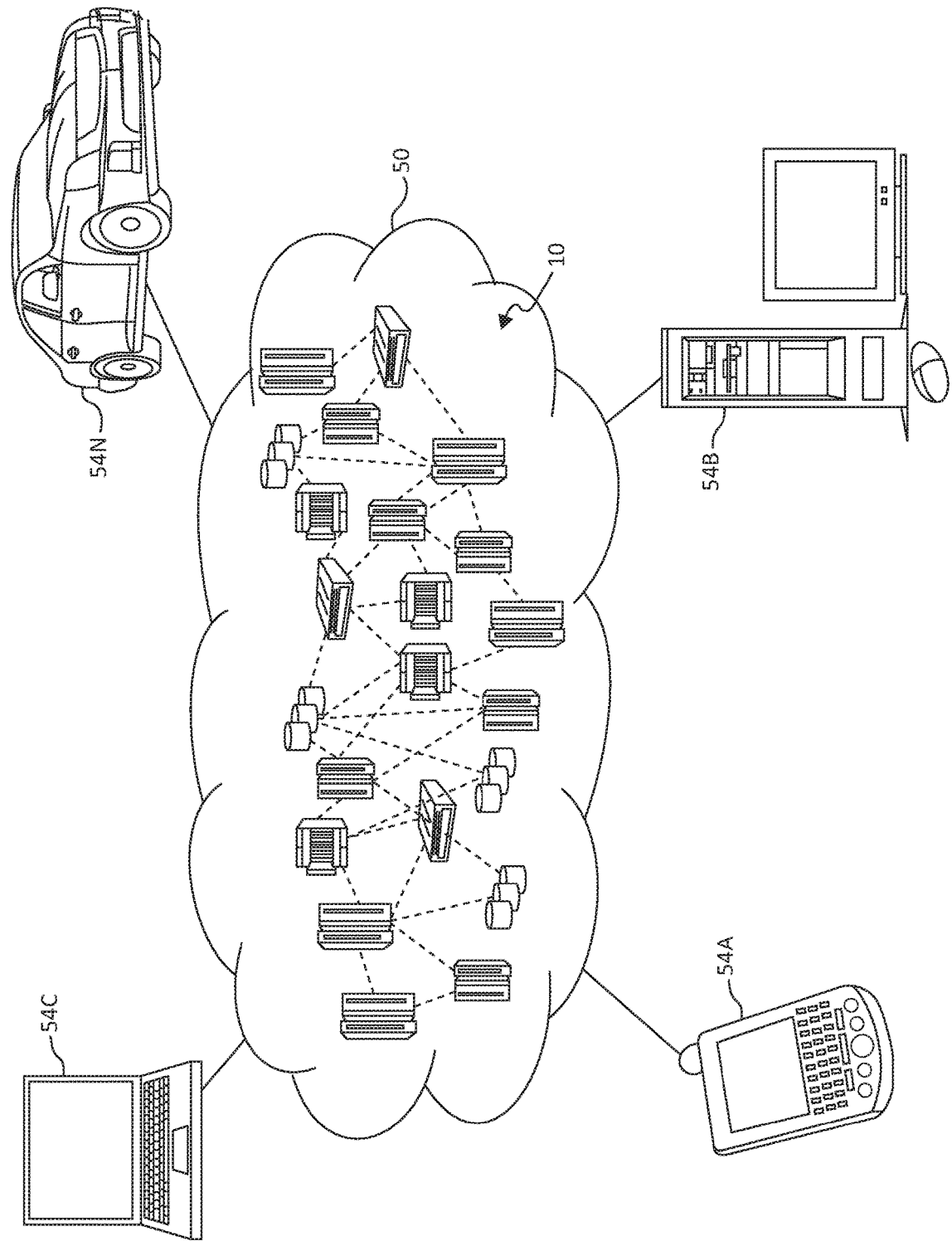
FIG. 2 is an additional block diagram depicting an exemplary cloud computing environment, according to embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
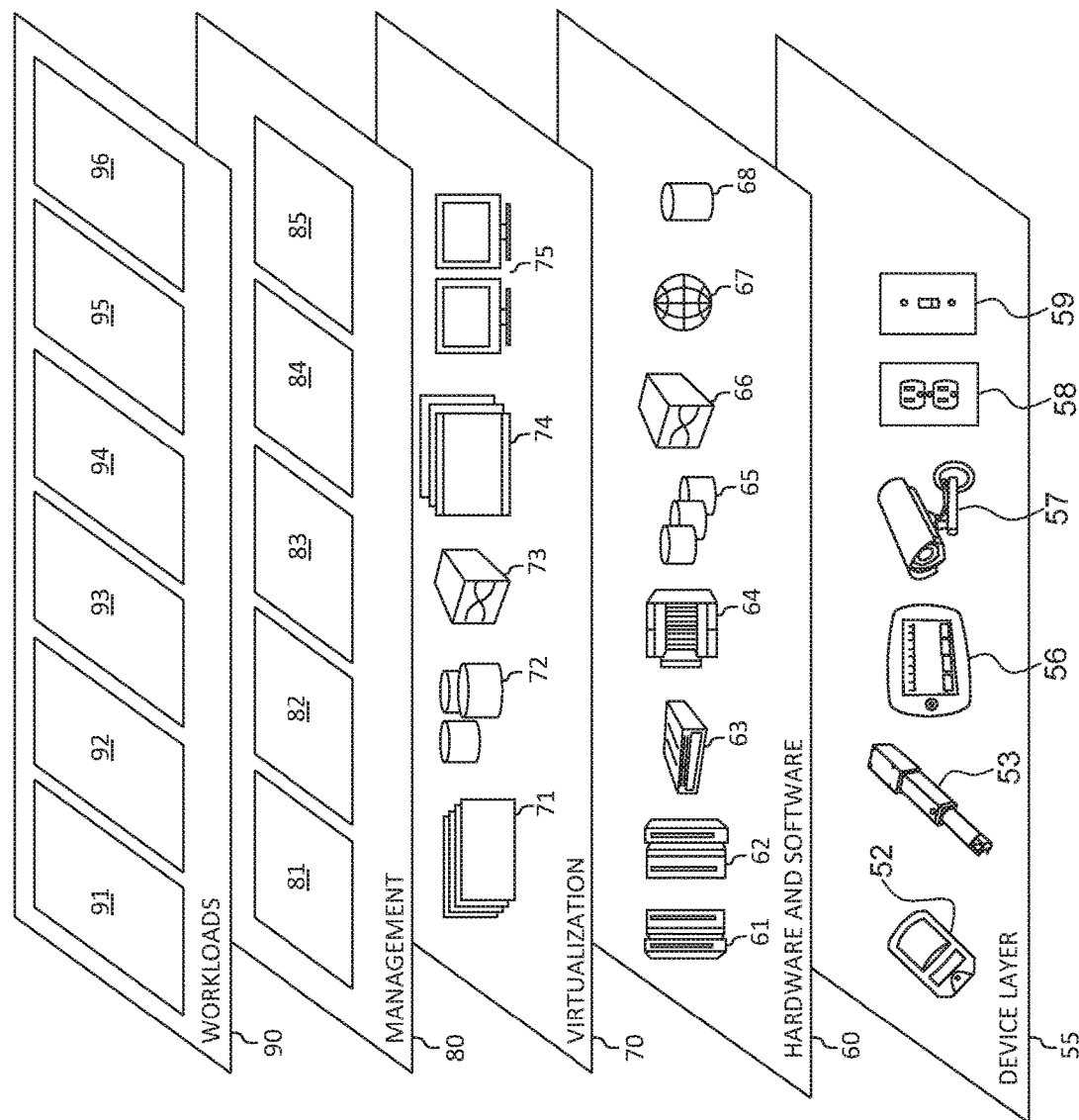
FIG. 3 is an additional block diagram depicting abstraction model layers, according to embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various conversational and dialog analytic functions 96. One of ordinary skill in the art will appreciate that the conversational and dialog analytics functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
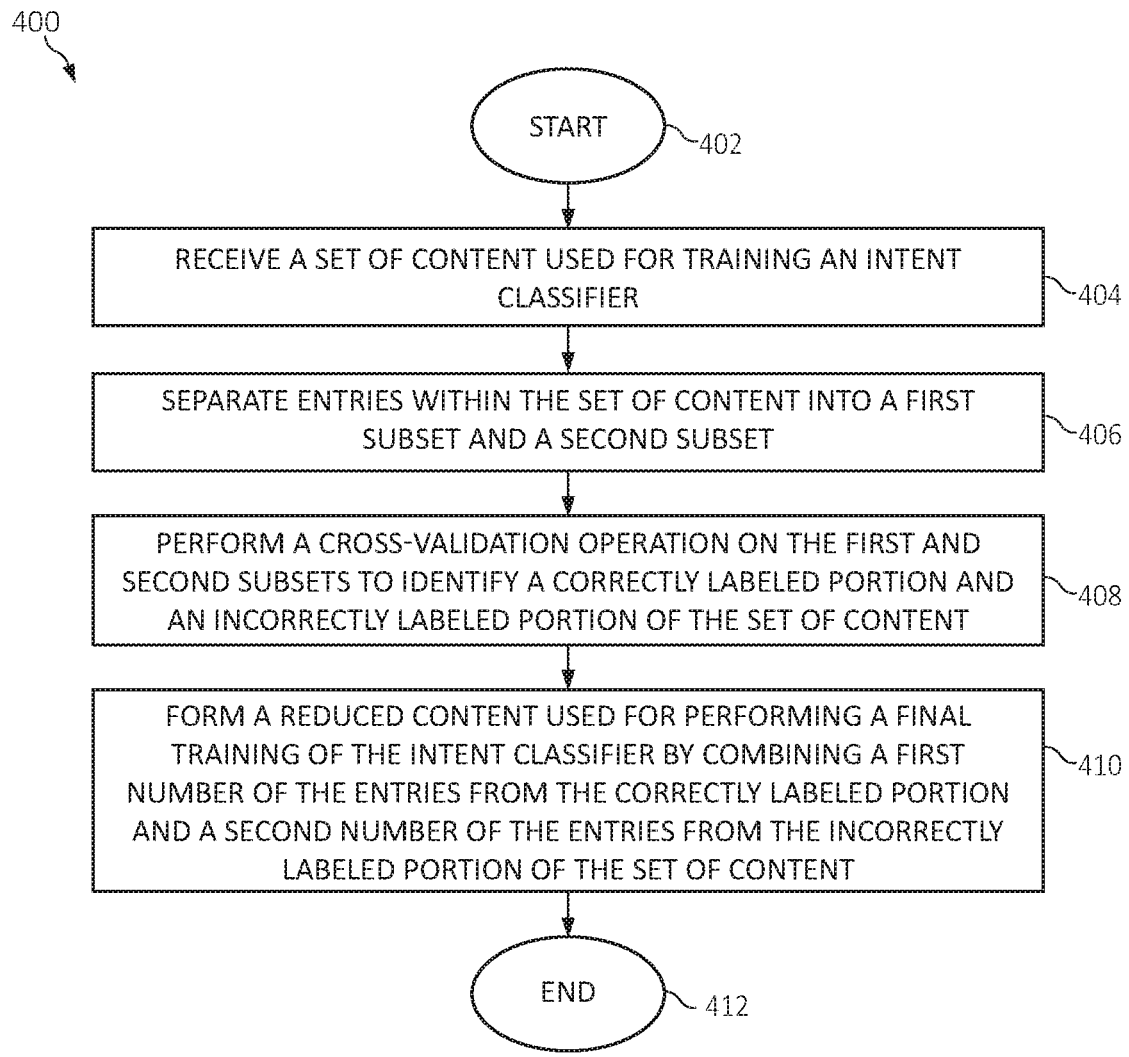
FIG. 4 is a flow chart diagram depicting a method for creating compact example subsets for intent classification, according to embodiments of the present invention.

Turning now to FIG. 4, a method 400 for creating compact example subsets for intent classification by a processor is depicted, in which various aspects of the illustrated embodiments may be implemented. The functionality 400 may be implemented as a method executed as instructions on a machine, where the instructions are embodied on a tangible, non-transitory machine-readable storage medium. The functionality of the method 400 may start at step 402. In some embodiments, a set of content used for training an intent classifier is received (e.g., from a conversational corpus, a database, etc.) (step 404). Entries within the set of content are separated into a first subset and a second subset (step 406). While this particular embodiment illustrates a two-fold split of the set of content, other variations of separating the content (i.e., other than a first and second subset) may exist in different implementations, as will be described. A cross-validation operation is performed on the first and second subsets to identify a correctly labeled portion and an incorrectly labeled portion of the set of content (step 408). A reduced content used for performing a final training of the intent classifier is formed by combining a first number of the entries from the correctly labeled portion and a second number of the entries from the incorrectly labeled portion of the set of content (step 410). The intent classifier associated with a given intent may then be trained using this reduced content. The method 400 ends (step 412).

As aforementioned, the mechanisms of the present invention use a novel two-step approach to selecting example sentences (utterances) associated with a given (input) intent or set of intents for training a target statistical classifier. First, a core set of example sentences (i.e., a core set having example sentence entries part thereof) and another edge set of example sentences (i.e., an edge set having example sentence entries part thereof) are each selected from the corpus and grouped together based on the behavior of the target classifier. Next, an anti-clustering procedure is applied to select entries from both sets of examples (i.e., the core set and the edge set) to maximize the diversity and coverage of the example sentences.

Figure 5A:
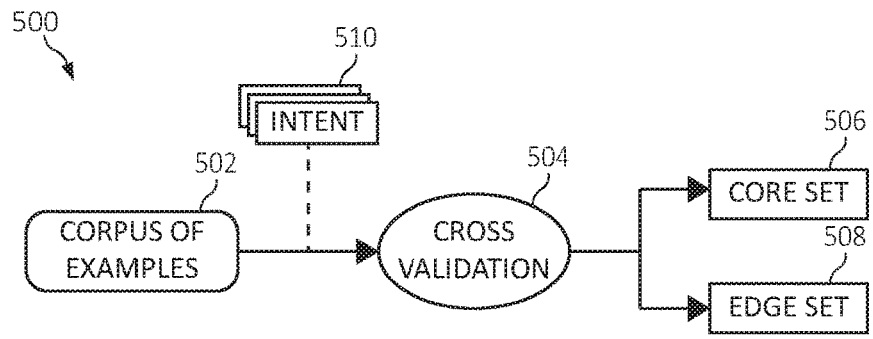
FIGS. 5A and 5B are combination block/flowchart diagrams depicting a cross-validation procedure for initial training of an intent classifier, according to embodiments of the present invention.
Figure 5B:
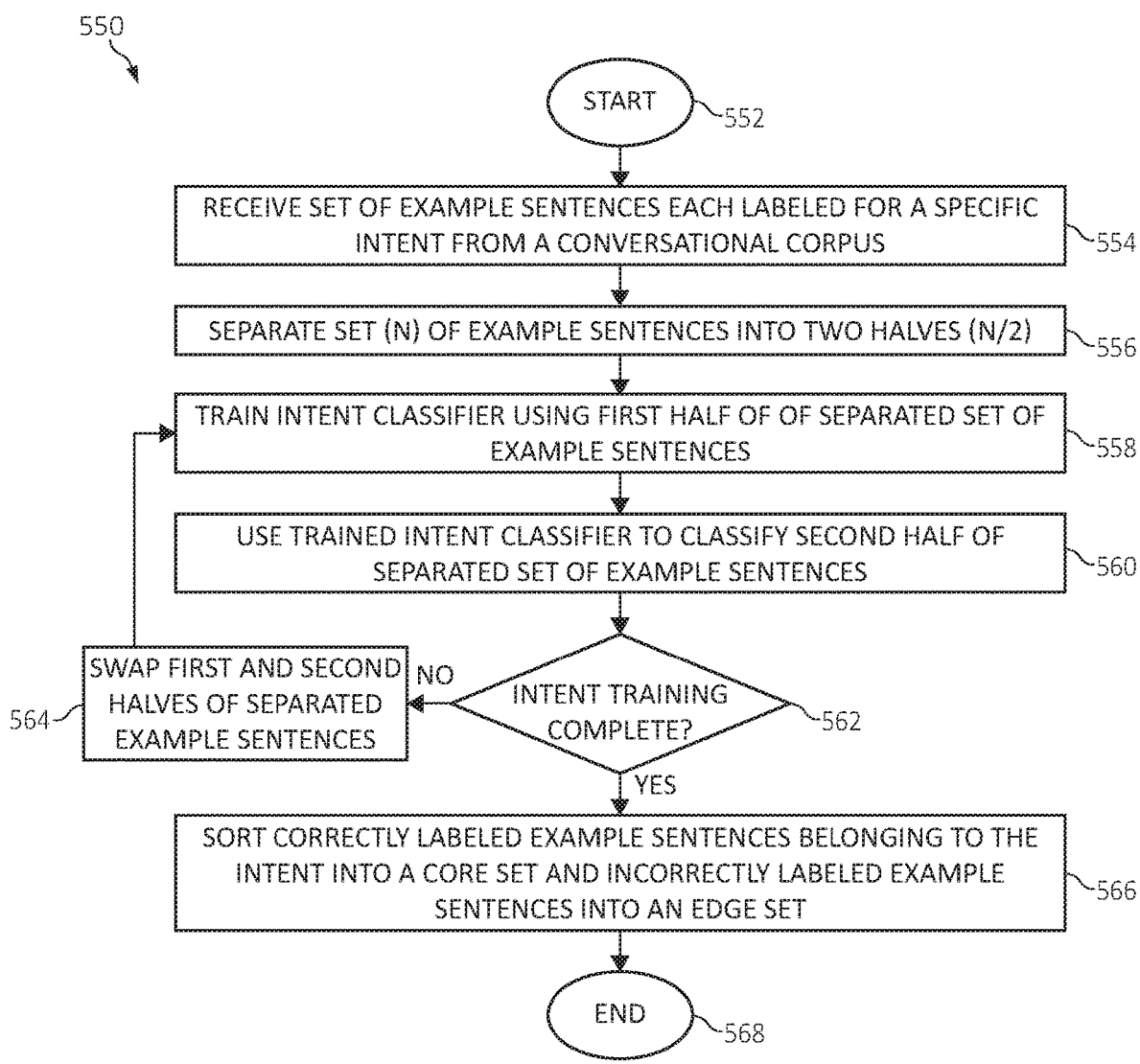

In accordance with aspects of the present invention, several functional components are considered. Referring now to FIGS. 5A and 5B, a combination block/flowchart diagram of a method for selecting the core and edge example sets from the corpus is depicted. That is, FIG. 5A illustrates functional components 500 used during the implementation of the method 550 illustrated in FIG. 5B. As shown, the various functions, or "modules" of functionality, hardware devices, and/or other components in the same descriptive sense as has been previously described in FIGS. 1-3 may be included in FIGS. 5A and 5B. For example, processing unit 16 and memory 28 of FIG. 1 may be employed in FIGS. 5A and 5B to perform various computational, data processing, storage and other functionality in accordance with various aspects of the present invention. Additionally, the functionality of the method 550 may be implemented as a method executed as instructions on a machine, where the instructions are embodied on a tangible, non-transitory machine-readable storage medium.

It is first assumed that a large set of example sentences are provided (e.g., in a corpus of examples 502), where each sentence is labeled with an associated intent of a set of intents 510, and is available for training an intent classifier. Further assuming that there are $N=n1+n2+ \ldots +np$ sentences for p intents of the set of intents 510, the functional goal of the system is to reduce the example set to a smaller number of example sentences, $M=m1+m2+ \ldots +mp$, with $mi<ni$ for all i. Accordingly, starting at step 552, a set of example sentences, each of which is labeled for a specific intent from the set (p) of intents 510 is received from the corpus of examples 502 (step 554). The entire set (N) of example sentences is then separated (divided) into two halves (N/2) (step 556).

Next, a two-fold cross-validation operation 504 is performed on each half of the set of example sentences by training the intent classifier using a first half of the separated set of example sentences (step 558). It should be noted that the classifier is trained with examples for multiple intents (i.e., from the set of intents 510) as input, rather than a single intent. This (initially) trained classifier is then used to classify the second half of separated example sentences (step 560) according to their associated intent(s). A determination is then made at step 562 as to whether the initial intent training is complete. The initial intent training is deemed complete if both halves of the set of separated example sentences have been used by the intent classifier to train the other half and vice versa.

In other words, one half of the examples of the set of example sentences is used to train the intent classifier, and this trained intent classifier subsequently is used to classify the other half of the set of examples. The two halves of the set of example sentences are then switched and this process is performed anew (i.e., the second half is used to subsequently train the intent classifier using the first half of examples, which subsequently trained classifier is used to classify the second half). Thus, if, at step 560, if both halves of the set of separated example sentences have not been used to train the other half (and vice versa), the two halves (subsets) are swapped (step 564), and the method 550 returns to step 558. Otherwise, at step 562, once the cross-validation operation 504 is complete, the correctly labeled example sentences which are correctly classified according to the given intent of the set of intents 510 are sorted into a core set 506, and the incorrectly labeled example sentences wrongly classified according to the given intent of the set of intents 510 are sorted into an edge set 508 (step 566). The method 550 then ends (step 568).

It is important to note that the illustrated embodiment uses a simple two-fold split (i.e., the first and second subsets) for performing the cross-validation operation. In other implementations, variations may exist when implementing the splitting (e.g., performing a ten-fold split, and taking nine of the folds to train a classifier and applying the trained classifier to the remaining (tenth) fold, and performing the same for all ten passes of the cross-validation operation. That is, the goal of identifying a correctly labeled set and an incorrectly labeled set remains the same despite the method of splitting.

Figure 6A:
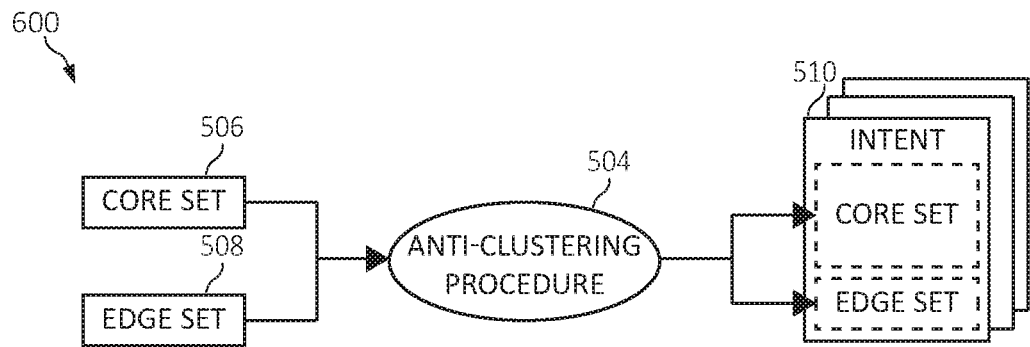
FIGS. 6A and 6B are combination block/flowchart diagrams depicting a reduction and anti-clustering procedure for forming a reduced set of intent data for final training of the intent classifier, according to embodiments of the present invention.
Figure 6B:
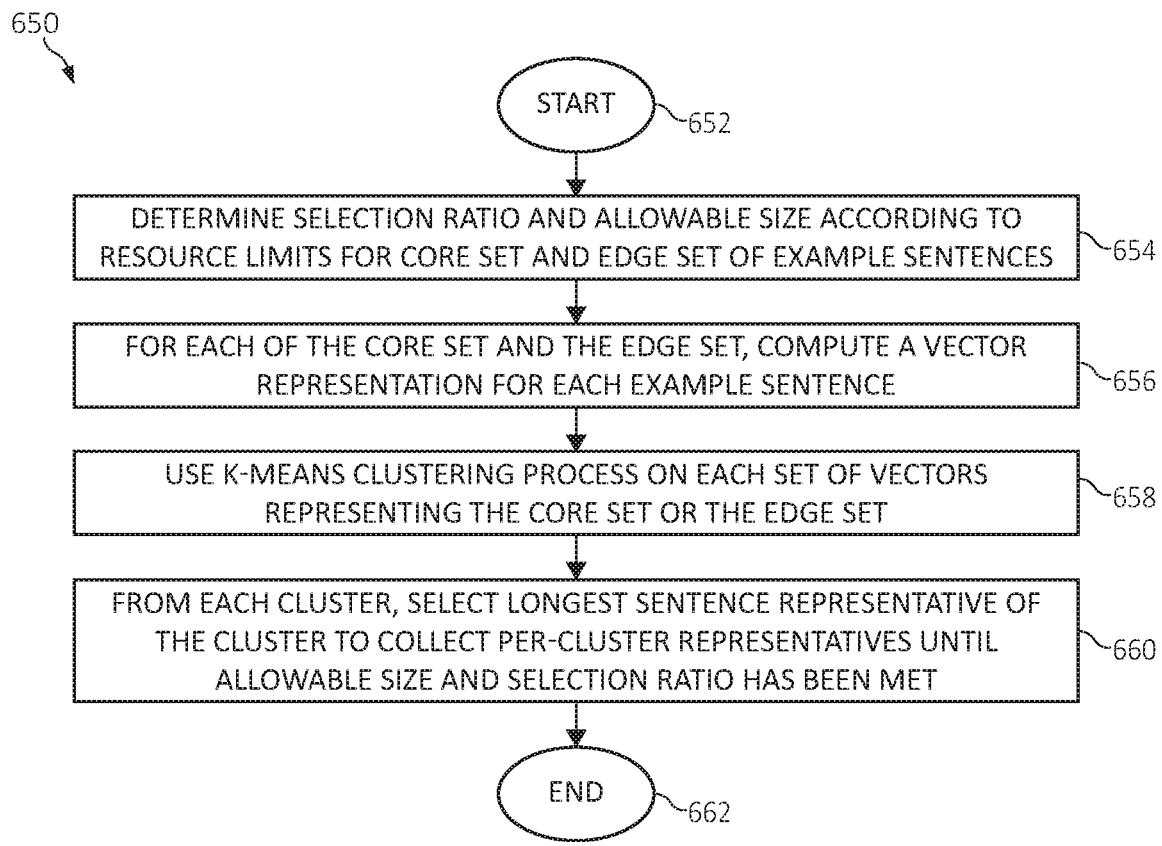

Referring now to FIGS. 6A and 6B, a combination block/flowchart diagram of a method for reducing the core and edge example sets from the corpus is depicted. That is, FIG. 6A illustrates functional components 600 used during the implementation of the method 650 illustrated in FIG. 6B. As shown, the various functions, or "modules" of functionality, hardware devices, and/or other components in the same descriptive sense as has been previously described in FIGS. 1-3 may be included in FIGS. 6A and 6B. For example, processing unit 16 and memory 28 of FIG. 1 may be employed in FIGS. 6A and 6B to perform various computational, data processing, storage and other functionality in accordance with various aspects of the present invention. Additionally, the functionality of the method 650 may be implemented as a method executed as instructions on a machine, where the instructions are embodied on a tangible, non-transitory machine-readable storage medium.

In various embodiments, subsequent to obtaining the core set 506 and the edge set 508, an anti-clustering procedure 604 is then utilized to reduce by selection example sentences within the core set 506 and the edge set 508. This reduced set is utilized to finally train the intent classifier according to the given intent of the set of intents 510 associated with the respective example sentences. That is, the core set 506 and the edge set 508 are reduced separately, each with different selection ratios (i.e., a number of examples provided to the intent classifier from each set). The ratios are to be determined by the full size of the example set (N) and the allowable size (M) that fits within resource limits. In some implementations, it may be recommended that 80% of the allowable example slots be allocated to the core set 506, and 20% of the allowable example slots be allocated to the edge set 508, although this ratio is exemplary and may comprise any convenient number. This given ratio serves to accommodate a balance between the necessity for the example sentences to match the semantic expectation of the intent (i.e., by including additional examples known to accurately represent the given intent from the core set 506) and the need to include some novelty (i.e., by including outlying examples known to represent the given intent in a more flexible way from the edge set 508).

Reduction of the core set 506 and the edge set 508 is then achieved according to the method 650, which may begin at step 652. It should again be noted that the anti-clustering procedure 604 is applied to the core set 506 and the edge set 508 for each intent of the set of intents 510 separately, and each of the sets may be subject to separate size and/or resource limit constraints. Initially, a selection ratio between entry (i.e., individual example sentences) selections from the core set 506 and the edge set 508, and the allowable size of the entire example set is determined according to resource limits (step 654). These resource limits may comprise a predetermined hardware limits (e.g., a memory or storage use threshold used to store the selected examples, CPU or network processing thresholds, etc.) and/or merely a constraint of a predetermined number of the entries within the entire set of example as defined by a user.

Next, a vector representation for each sentence within the core set 506 and the edge set 508, respectively, is computed using a standard method such as term frequency-inverse document frequency (TF-IDF) vectorization or sentence embedding (step 656). A k-means clustering process is then performed on each set of vectors representing the core set 506 or the edge set 508 of each intent of the set of intents 510, respectively, where k equals the desirable (predefined by a user) size of the reduced set (step 658). From each of the k clusters, the longest sentence (utterance) is selected as a representative of the given cluster. Thus, as the per-cluster representatives are collected (and the other in-cluster members are ignored), the cluster sampling process effectively yields an "anti-clustering" effect where the selected samples are maximally spread (step 660). The method 650 ends (step 662).

In an actual implementation of this system, an experiment provided validation to this approach. Beginning with a set of 45,891 English sentences in 104 intents, the disclosed two-step process was used to reduce the initial set to a reduced set of 2600 (25 sentences for each intent). The N-gram distributions for the resultant set of sentences was analyzed and compared to those of another set of 2600 sentences obtained by simple random sampling. It was observed that the number of unique N-grams is larger for the sentences selected using the proposed method (i.e., because the sentences included more linguistic varieties), as illustrated in Table 1:

TABLE 1

| N-gram | Random Sampling | Anti-Clustering Sampling |
| --- | --- | --- |
| Unigram | 1955.3 | 2378.6 |
| Bigram | 7643.8 | 8977.3 |
| Trigram | 10957.7 | 12324.8 |

Random sampling was then performed for 10 passes, and in each pass the target classifier was trained with the random sample. The trained classifier was then applied to the unused sentences (by either the proposed selection method or by any of the random sampling passes) from the full dataset. This operation resulted in a mean accuracy of 76.70%. In comparison, the training samples selected using the proposed method resulted in an accuracy of 77.30% for the same test data.

It should be noted that, commensurate with the context of the present invention, machine learning algorithms suitable for the disclosed functionality may comprise any statistical classifier trainable with a small number of seed utterances with user-provided or auto-propagated labels. In one aspect, the machine learning based models may be performed using a wide variety of methods or combinations of methods, such as supervised learning, unsupervised learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, and fuzzy clustering. Specific details regarding any of the examples of supervised, unsupervised, reinforcement learning, or other machine learning described in this paragraph are known and are considered to be within the scope of this disclosure.

Further, it should be noted that the present invention may be an apparatus, a system, a method, and/or a computer program product. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for creating compact example subsets for intent classification, by a processor, comprising:
receiving a set of content used for training an intent classifier;
separating entries within the set of content into a first subset and a second subset;
performing a cross-validation operation on the first and second subsets to identify a correctly labeled portion and an incorrectly labeled portion of the set of content, wherein the cross-validation operation further comprises:

performing an initial training of the intent classifier utilizing the first subset to form a first subset trained classifier;

utilizing the first subset trained classifier against the second subset to identify a correctly labeled subset and an incorrectly labeled subset of the second subset;

performing a secondary training of the intent classifier, subsequent to the initial training, to form a second subset trained classifier; and utilizing the second subset trained classifier against the first subset to identify a correctly labeled subset and an incorrectly labeled subset of the first subset; and forming a reduced content used for performing a final training of the intent classifier by combining a first number of the entries from the correctly labeled portion and a second number of the entries from the incorrectly labeled portion of the set of content, wherein an anti-clustering procedure, performed separately and independently on each of the first subset and the second subset, is utilized to select members of the first number of the entries and members of the second number of the entries by:

computing a vector representation for each of the entries from the correctly labeled portion and the entries from the incorrectly labeled portion of the set of content;

clustering each of a set of vectors representing the correctly labeled portion and the incorrectly labeled portion into k clusters, wherein k equals a desired size of the reduced content;

selecting a longest entry in each of the k clusters as a cluster representative to yield maximally-spread samples among all of the k clusters, wherein each other in-cluster members of each of the k clusters are ignored; and using the selected longest entry in each of the k clusters aggregately as the first number of the entries and the second number of the entries comprising the reduced content.

2. The method of claim 1, further comprising organizing the correctly labeled subset of the first subset and the correctly labeled subset of the second subset into the correctly labeled portion; and organizing the incorrectly labeled subset of the first subset and the incorrectly labeled subset of the second subset into the incorrectly labeled portion.

3. The method of claim 1, wherein, commensurate with the combining, the first number of entries is larger than the second number of entries.

4. The method of claim 1, wherein the content comprises utterances received from a conversational corpus.

5. A system for creating compact example subsets for intent classification, comprising:

a processor executing instructions stored in a memory device; wherein the processor:

receives a set of content used for training an intent classifier;

separates entries within the set of content into a first subset and a second subset;

performs a cross-validation operation on the first and second subsets to identify a correctly labeled portion and an incorrectly labeled portion of the set of content, wherein the cross-validation operation further comprises:

performing an initial training of the intent classifier utilizing the first subset to form a first subset trained classifier;

utilizing the first subset trained classifier against the second subset to identify a correctly labeled subset and an incorrectly labeled subset of the second subset;

performing a secondary training of the intent classifier, subsequent to the initial training, to form a second subset trained classifier; and utilizing the second subset trained classifier against the first subset to identify a correctly labeled subset and an incorrectly labeled subset of the first subset; and forms a reduced content used for performing a final training of the intent classifier by combining a first number of the entries from the correctly labeled portion and a second number of the entries from the incorrectly labeled portion of the set of content, wherein an anti-clustering procedure, performed separately and independently on each of the first subset and the second subset, is utilized to select members of the first number of the entries and members of the second number of the entries by:

computing a vector representation for each of the entries from the correctly labeled portion and the entries from the incorrectly labeled portion of the set of content;

clustering each of a set of vectors representing the correctly labeled portion and the incorrectly labeled portion into k clusters, wherein k equals a desired size of the reduced content;

selecting a longest entry in each of the k clusters as a cluster representative to yield maximally-spread samples among all of the k clusters, wherein each other in-cluster members of each of the k clusters are ignored; and using the selected longest entry in each of the k clusters aggregately as the first number of the entries and the second number of the entries comprising the reduced content.

6. The system of claim 5, wherein the processor organizes the correctly labeled subset of the first subset and the correctly labeled subset of the second subset into the correctly labeled portion; and organizes the incorrectly labeled subset of the first subset and the incorrectly labeled subset of the second subset into the incorrectly labeled portion.

7. The system of claim 5, wherein, commensurate with the combining, the first number of entries is larger than the second number of entries.

8. The system of claim 5, wherein the content comprises utterances received from a conversational corpus.

9. A computer program product for creating compact example subsets for intent classification, by a processor, the computer program product embodied on a non-transitory computer-readable storage medium having computer-readable program code portions stored therein, the computer-readable program code portions comprising:

an executable portion that receives a set of content used for training an intent classifier;

an executable portion that separates entries within the set of content into a first subset and a second subset;

an executable portion that performs a cross-validation operation on the first and second subsets to identify a correctly labeled portion and an incorrectly labeled portion of the set of content, wherein the cross-validation operation further comprises:
  performing an initial training of the intent classifier utilizing the first subset to form a first subset trained classifier;
  utilizing the first subset trained classifier against the second subset to identify a correctly labeled subset and an incorrectly labeled subset of the second subset;
  performing a secondary training of the intent classifier, subsequent to the initial training, to form a second subset trained classifier; and
  utilizing the second subset trained classifier against the first subset to identify a correctly labeled subset and an incorrectly labeled subset of the first subset; and
an executable portion that forms a reduced content used for performing a final training of the intent classifier by combining a first number of the entries from the correctly labeled portion and a second number of the entries from the incorrectly labeled portion of the set of content, wherein an anti-clustering procedure, performed separately and independently on each of the first subset and the second subset, is utilized to select members of the first number of the entries and members of the second number of the entries by:
  computing a vector representation for each of the entries from the correctly labeled portion and the entries from the incorrectly labeled portion of the set of content;
  clustering each of a set of vectors representing the correctly labeled portion and the incorrectly labeled portion into k clusters, wherein k equals a desired size of the reduced content;
  selecting a longest entry in each of the k clusters as a cluster representative to yield maximally-spread samples among all of the k clusters, wherein each other in-cluster members of each of the k clusters are ignored; and
  using the selected longest entry in each of the k clusters aggregately as the first number of the entries and the second number of the entries comprising the reduced content.

10. The computer program product of claim 9, further comprising an executable portion that organizes the correctly labeled subset of the first subset and the correctly labeled subset of the second subset into the correctly labeled portion; and organizes the incorrectly labeled subset of the first subset and the incorrectly labeled subset of the second subset into the incorrectly labeled portion.

11. The computer program product of claim 9, wherein, commensurate with the combining, the first number of entries is larger than the second number of entries.

12. The computer program product of claim 9, wherein the content comprises utterances received from a conversational corpus.

* * * * *